US011307180B2

(12) United States Patent
Gutmann et al.

(10) Patent No.: US 11,307,180 B2
(45) Date of Patent: Apr. 19, 2022

(54) METHOD AND APPARATUS FOR AUTOMATIC CHROMATOGRAPHY OF THIN-LAYER PLATES

(71) Applicant: Camag Chemie-Erzeugnisse und Adsorptionstechnik AG, Muttenz (CH)

(72) Inventors: Bastian Gutmann, Winterthur (CH); Nicolas Richerdt, Michelbach le bas (FR); Urs Lukas Schranz, Basel (CH); Mark Howell Sturgess, Basel (CH)

(73) Assignee: CAMAG CHEMIE-ERZEUGNISSE UND ADSORPTIONSTECHNIK, AG, Muttenz (CH)

( * ) Notice: Subject to any disclaimer, the term of this patent is extended or adjusted under 35 U.S.C. 154(b) by 424 days.

(21) Appl. No.: 16/446,908

(22) Filed: Jun. 20, 2019

(65) Prior Publication Data
US 2019/0391119 A1    Dec. 26, 2019

(51) Int. Cl.
*G01N 30/38* (2006.01)
*B01D 15/42* (2006.01)
(Continued)

(52) U.S. Cl.
CPC ............ *G01N 30/38* (2013.01); *B01D 15/42* (2013.01); *G01N 30/93* (2013.01); *G01N 2030/025* (2013.01)

(58) Field of Classification Search
CPC .. G01N 30/94; G01N 30/95; G01N 2030/945; G01N 30/90; G01N 30/91;
(Continued)

(56) References Cited

U.S. PATENT DOCUMENTS 3,342,333 A * 9/1967 Geiss ............... G01N 30/94
                                                       210/186
3,864,250 A * 2/1975 Perry ............... G01N 30/94
                                                       210/198.3
(Continued)

FOREIGN PATENT DOCUMENTS

CN    101858900 A  * 10/2010
DE      2412524        9/1974
(Continued)

OTHER PUBLICATIONS

Camag, Instrumental Thin-Layer Chromatography Edition 2017 (Year: 2017).*

*Primary Examiner* — Nimeshkumar D Patel
*Assistant Examiner* — Gedeon M Kidanu
(74) *Attorney, Agent, or Firm* — Donald J. Ersler

(57) ABSTRACT

A method for the automatic chromatography of thin-layer plates for thin-layer chromatography with a development chamber 1 in which a thin-layer plate D is completely enclosed, sealed-off and isolated from the external environment. In the development chamber, a front space containing an inner atmosphere is located on the front face of the separation layer of the thin-layer plate. The depth of the front space is about 2 mm and a maximum 3 mm. An inlet is provided at one end of the front space and an outlet is provided at the other end of the front space. During the chromatographic development, a stream of gas of particular composition determined by the user is created throughout the entire front space, the entire inner atmosphere being set in motion, without stagnant or stationary gas phase.

15 Claims, 11 Drawing Sheets

(51) Int. Cl.
*G01N 30/93* (2006.01)
*G01N 30/02* (2006.01)

(58) Field of Classification Search
CPC ........... G01N 30/88; G01N 2021/1774; G01N 2021/3155; G01N 2030/0095; G01N 2030/025; G01N 2030/027; G01N 2030/8804; G01N 21/3151; G01N 21/5911; G01N 2201/101; G01N 30/38; G01N 30/92; G01N 30/93; G01N 33/22; G01N 35/10
See application file for complete search history.

(56) References Cited

U.S. PATENT DOCUMENTS

| | | | | |
|---|---|---|---|---|
| 4,916,829 | A | * | 4/1990 | Takiue .................. F26B 13/10 34/446 |
| 6,096,205 | A | * | 8/2000 | Haas ...................... G01N 30/90 210/198.3 |
| 6,709,584 | B2 | * | 3/2004 | Guller ................... G01N 30/91 210/198.3 |
| 8,815,606 | B2 | * | 8/2014 | Pagoria ................. G01N 30/94 436/166 |
| 9,976,999 | B2 | * | 5/2018 | Schulz ................... G01N 30/91 |
| 10,458,963 | B2 | * | 10/2019 | Stitzlein ................ G01N 30/95 |
| 10,578,595 | B2 | * | 3/2020 | Schulz ................. G02B 21/361 |
| 2003/0013187 | A1 | * | 1/2003 | Guller ................... G01N 30/94 436/514 |
| 2020/0018734 | A1 | * | 1/2020 | Stitzlein ................ G01N 30/94 |

FOREIGN PATENT DOCUMENTS

| | | | | | |
|---|---|---|---|---|---|
| DE | 2814993 | A1 | * | 10/1979 | ............ G01N 30/94 |
| DE | 4031909 | A1 | * | 4/1992 | ............ G01N 30/95 |
| SE | 454729 | B | * | 5/1988 | |

\* cited by examiner

METHOD AND APPARATUS FOR AUTOMATIC CHROMATOGRAPHY OF THIN-LAYER PLATES

The present invention relates to a method for automatic chromatography of thin-layer plates in the field of thin-layer chromatography according to the preamble of patent claim 1 and an apparatus for carrying out this method according to the preamble of patent claim 8.

Thin-layer chromatography is a separation method for analyzing the composition of liquid samples consisting of two essential steps:

1) The application of the sample to the separation layer of a thin-layer plate, usually a silica gel layer (the so-called stationary phase);

2) The chromatographic development, wherein usually the lower end of the thin-layer plate is brought into contact with an eluent which migrates upwards at a certain speed in the separation layer by capillary forces (the so-called mobile phase).

During the chromatographic development, the molecules contained in the sample are carried by the eluent through the separation layer. Due to their different chemical properties, different molecules of the sample have different migration velocities in the separation layer. For this reason, the different molecules are located after a certain time at different distances relative to the application position on the thin-layer plate, are thus separated and can be distinguished from one another. Thin-layer chromatography is therefore very easy to implement experimentally and requires no complex equipment and infrastructure.

Accordingly, in most laboratories, thin-layer chromatography is carried out with the simplest means by placing the thin-layer plate with the applied sample in a container in which an eluent is present. The chromatographic development phase begins as soon as the lower end of the thin-layer plate is immersed in the eluent. After a certain time, the thin-layer plate is removed from the container and dried in order to end the chromatographic development phase.

SUMMARY OF THE INVENTION

A major shortcoming of this simple method is the poor reproducibility of the resulting chromatograms, making comparisons of results on different plates and at different locations difficult. The reason for this is the lack of control of the parameters influencing the chromatographic development: in addition to the physical and chemical properties of the separation layer in terms of activity and selectivity and to the composition of the solvent, there are also interactions between the inner atmosphere of the development chamber (chamber atmosphere) and the thin-layer plate.

The above mentioned shortcoming is known, and several solutions for controlling the chamber atmosphere before and/or during chromatographic development can be found in the prior art. It is explained in the U.S. Pat. No. 3,342,333 A that identical atmospheric conditions must be maintained during the entire chromatographic development phase. Thus, a development chamber was built for the controlled humidification and drying of thin-layer plates prior to chromatographic development under a controlled atmosphere. However, it is not sufficient to carefully adjust the inner atmosphere before the start of the chromatographic development, since it constantly changes in the course of the chromatographic development, in particular at the interface with the thin-layer plate due to the evaporation of the eluent. For this reason, a stirring propeller is provided for the homogenization of the inner atmosphere in the chromatographic development chamber according to U.S. Pat. No. 3,342,333 A. However, this represents a complex infrastructure, with a fairly large volume, in which a chaotic and hardly controllable gas flow is generated. Besides, the chromatographic development process is time-controlled and passive, i.e. the various process steps are performed according to a fixed, predetermined time schedule and without monitoring of the actual progress of the process.

Patent document DE 2412524 A1 (US filing is U.S. Pat. No. 3,864,250) describes a chamber for improving the performance and the speed of the chromatographic development process by applying heat and pressure. Inlet and outlet openings are provided for regulating the inner atmosphere of the chamber, through which gases and vapors from the interior of the chamber can be distributed or removed uniformly and without strong channeling of the stream of gas, in particular in the vicinity of the plate surface. The inner atmosphere plays the role of a buffer volume between the inlet and outlet openings, which is intended to maintain a relatively constant composition in the course of chromatographic development, and whose homogenization is based on the diffusion of the chemical substances. Diffusion phenomena, however, are particularly slow, which may result in inhomogeneities in the composition of the inner atmosphere, particularly at the interface between the plate and the remainder of the volume. Here, the chromatographic development process is also time-controlled and passive.

The object of the present invention is to improve the known methods and apparatuses for automatic chromatography of thin-layer plates in order to achieve a better control of the parameters influencing the chromatographic development, in particular the physical and chemical properties of the separation layer with respect to activity and selectivity and the composition of the inner atmosphere of the development chamber during chromatographic development.

This is achieved by the method for automatic chromatography of thin-layer plates according to the preamble of patent claim 1 and by the apparatus for carrying out this method according to the preamble of patent claim 8. Further features and exemplary embodiments are describes in the dependent claims.

Figure 1:
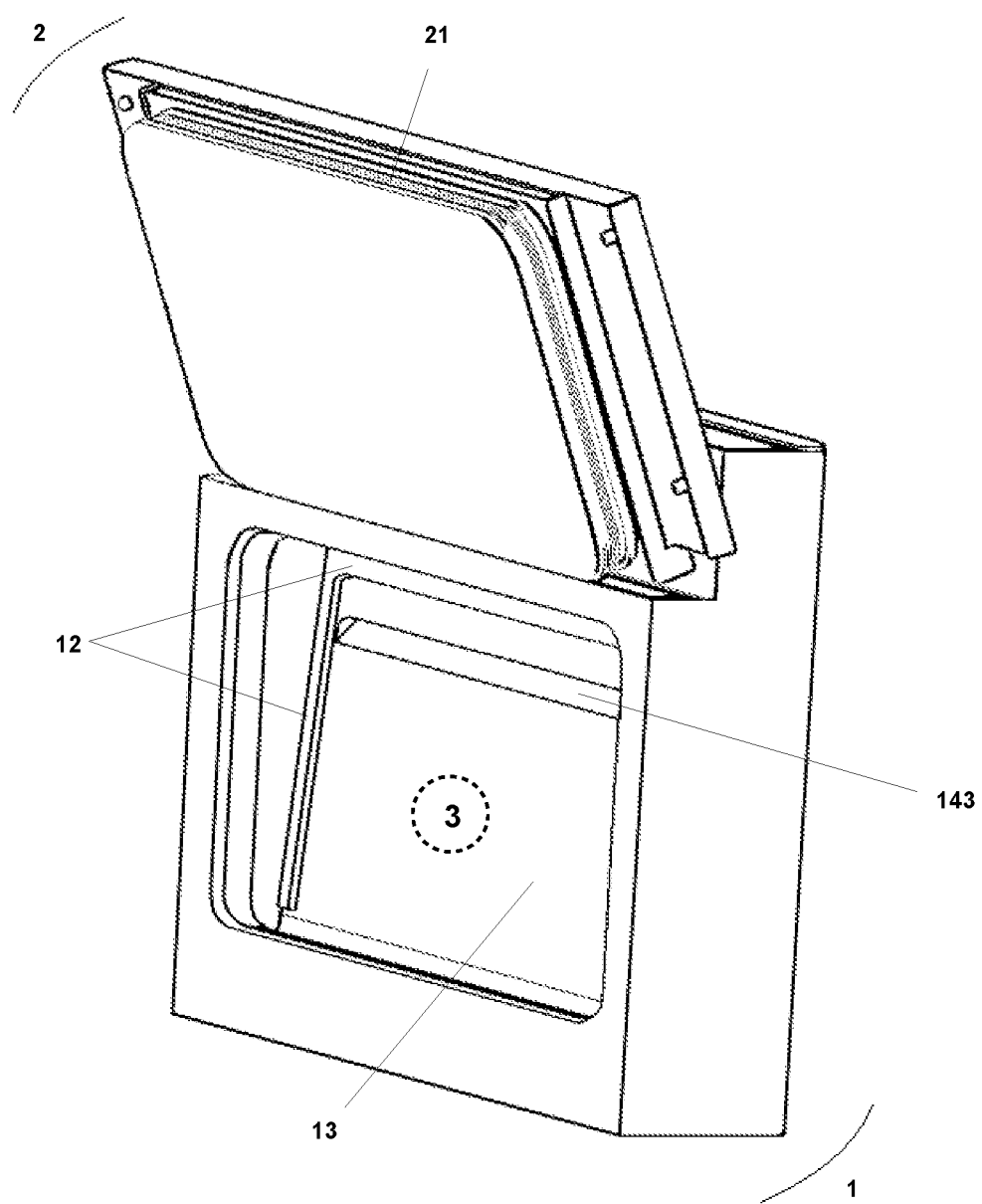
FIG. 1: Overall view of the apparatus with development chamber and door.

The figures represent possible embodiments, which will be explained in the following description.

DETAILED DESCRIPTION OF THE PREFERRED EMBODIMENTS

The core of the invention is a method and an apparatus for automatic chromatography of thin-layer plates with a development chamber 1, in which a thin-layer plate D is sealed off and isolated from the external environment. For the good isolation and sealing-off of the thin-layer plate D, it is important that it is completely enclosed in the development chamber 1 with the entire separation layer and the carrier material. With the isolation of the thin-layer plate D in the development chamber 1, the chromatographic development can be carried out under very specific, adjustable, advantageous and above all accurately reproducible conditions, regardless of the external temperature, humidity and/or pressure. As a result, a much better reproducibility of the chromatographic developments is achieved, which allows cross-plate and cross-site comparisons.

The inventive method and the corresponding apparatus for the automatic chromatography of thin-layer plates will be described and their advantages explained in the following description.

Method

Three major measures contribute to improving the quality and reproducibility of the thin-layer plate chromatography: the preparation of the separation layer in terms of activity and selectivity, the preparation resp. continuous regulation of the composition of the inner atmosphere of the development chamber 1, and the performance of these steps in a closed and controlled environment, wherein the thin-layer plate D is well isolated and sealed off from the environment. Either one of these measures alone or any combination of these three measures can be used in the method according to the invention. In order to prepare the separation layer and prepare resp. continually regulate the composition of the inner atmosphere, the desired result can be achieved with a stream of gas generated throughout the entire development chamber 1 and having a particular composition determined by the user.

The composition of the inner atmosphere of the development chamber 1 can be set before the beginning of the chromatographic development and/or continuously regulated during the chromatographic development. In order to achieve this, the stream of gas entering the development chamber 1 drives the inner atmosphere already in the development chamber 1 frontally out of the development chamber 1 without turbulences and without mixing with it (or as little as possible). As a result, the inner atmosphere is not simply stirred but completely replaced. The complete replacement of the inner atmosphere already in the development chamber 1 with an incoming gas having a controlled composition is a simple way of regulating the composition of the inner atmosphere. The inner atmosphere can therefore be set as desired and depending on the application, it can be kept constant or vary over time during the chromatographic development. Since the various method steps are carried out in a closed and controlled environment, the stream of gas leaving the development chamber 1 must be continuously regenerated and its composition restored to the desired composition before being reintroduced into the development chamber.

It is important that the created inner atmosphere is as uniform as possible over the entire surface of the thin-layer plate D. In order to achieve this, the entire inner atmosphere must be set in motion, without any stagnant or stationary gas phase. However, the movement of the inner atmosphere must not be chaotic to avoid uncontrolled turbulences and local inhomogeneities. Thus, it is advantageous to generate a laminar stream of gas because this ensures a regular movement of the inner atmosphere. It is particularly advantageous when a unidirectional laminar stream of gas with parallel flow lines and uniform flow rate is generated in the entire development chamber 1 and over the entire surface of the separation layer. It is also advantageous if the flow rate of the stream of gas is set such that the flowing inner atmosphere remains in the development chamber 1 only for a short time, so that its composition does not change significantly while it flows through the development chamber 1 and in a manner that it is renewed continuously. As a result, the composition of the inner atmosphere is as uniform as possible in the entire development chamber 1 and over the entire separation layer and corresponds essentially to the composition of the incoming stream of gas. However, a compromise must be found between too low and too high flow rates of the stream of gas, as too high a flow rate also has negative effects. Strictly speaking, no absolute uniformity of the composition of the inner atmosphere in the development chamber is achieved, but a gradient in the flow direction between the upstream and downstream ends of the thin-layer plate D. This is not particularly disadvantageous when the areas of the thin-layer plate D, which are to be compared with each other are at the same height perpendicularly to the flowing direction of the stream of gas. These areas of the thin-layer plate D are at the same height perpendicularly to the direction of migration of the eluent in the separation layer. In the preferred embodiment of the invention, the direction of the stream of gas therefore has an angle of 0° or 180° to the direction of migration of the eluent in the separation layer, i.e. the stream of gas flows preferably in the migration direction or in the opposite direction.

The preparation of the separation layer takes place before the start of the chromatographic development, so that the separation layer has the desired properties at the beginning of the development. In order to achieve this, the stream of gas entering the development chamber 1 acts strongly on the separation layer. For this, it is ensured that a controlled stream of gas is generated at any given point of the inner atmosphere and of the surface of the separation layer. According to the invention, the inner atmosphere is not an interfering factor whose influence on the separation layer (and on the processes taking place therein during chromatographic development) is to be minimized, but an advantageous means to precisely prepare the separation layer and regulate the chromatographic development by the direct and controlled action of a stream of gas having a precisely defined composition onto the surface of the separation layer.

In order to prepare the separation layer in terms of activity and selectivity, the thin-layer plate D may be subjected to two important preparatory steps prior to the chromatographic development. The first, optional preparatory step may be activation of the thin-layer plate D, whereby the moisture of the separation layer is adjusted. Preferably, the activation should allow a certain amount of water molecules to be adsorbed onto the stationary phase. In any case, it is important that the separation layer has a uniform, user-determined moisture after activation. The second preparatory step is the preconditioning, wherein the inner atmosphere is saturated with a defined gaseous composition, and the separation layer is loaded with defined substances in a defined manner. The mentioned gaseous composition is generated from a combination of solvents whose properties may vary widely depending on the application in order to achieve the desired separation. The substances with which the separation layer is loaded also depend strongly on the molecules to be separated, and are often the same as the mobile phase. The separation layer is not necessarily saturated, but loaded in a defined manner, a saturation being a particular form of loading.

For the activation, the generated stream of gas has the desired humidity, and for the preconditioning, the stream of gas is saturated with the desired solvent components. It is important that the prepared separation layer has either uniform properties in terms of activity and selectivity over its entire surface or a selectivity gradient in the flowing direction of the stream of gas. For this purpose, the generated stream of gas must act uniformly on the entire surface of the separation layer. As described above, a laminar stream of gas is advantageous, in particular a unidirectional laminar stream of gas with a uniform flow rate over the entire surface of the separation layer. It is also advantageous if the flow rate of the stream of gas is set such that the flowing inner atmosphere only remains in the development chamber 1 for a short time, so that its composition does not change significantly as it flows through the development chamber 1, and it is renewed continually. This avoids that the properties of the separation layer are too different on opposite ends of the development chamber (close to the gas inlet and close to the gas outlet). Preferably, the activation and the preconditioning are not simply empirical and time-controlled, but the composition of the inner atmosphere (moisture and/or solvent content, etc.) can be measured and controlled. Due to the dependence of these measurements on temperature, these can be normalized with temperature measurements for better precision. With these measurements, the exact moment at which the activation and the preconditioning are completed can be determined automatically, and the next step of the process can be started immediately and automatically thereafter.

The activation, preconditioning and chromatographic development are the decisive steps of the method according to the invention. In possible embodiments, however, the method may also include further steps. An advantageous aspect of the invention is the complete automation of the method so that the whole method is carried out autonomously and without manual interaction. Besides, it is particularly advantageous if the exact moment at which a method step is completed or at which a desired, predefined state is reached is automatically determined with sensors so that the next step can be started automatically and immediately thereafter. The sequence of the steps is therefore not simply time-controlled. In a purely time-controlled sequence, the various steps are carried out according to a fixed, predetermined time schedule, without checking the actual progress of each step. Thus, in order to ensure that each method step is completed before the next one is started, the duration of each step is deliberately overestimated. This results in a significant accumulated loss of time in a complex multi-step method. The automatic determination of the end of a step with sensors and the immediate automatic triggering of the next step can thus lead to a considerable gain of time.

Below is a list of possible additional method steps (for the sake of clarity of the sequence of the steps, the activation, preconditioning and chromatographic development were also mentioned):

Automatic introduction of the thin-layer plate D to be developed into the development chamber 1;

Automatic closing and sealing-off of the development chamber 1 after introduction of the thin-layer plate D;

Automatically controlled activation of the thin-layer plate D and humidity adjustment;

Automatically controlled preconditioning of the inner atmosphere and of the separation layer;

Automatic introduction of an eluent into the development chamber 1 at the beginning of the chromatographic development;

Chromatographic development;

Automatic regulation of the eluent level during the chromatographic development;

Automatic control of the migration of the eluent through the separation layer during the chromatographic development;

Automatic removal of the eluent from the development chamber 1 at the end of the chromatographic development;

Automatic drying of the thin-layer plate D;

Automatic opening of the development chamber 1 and removal of the developed thin-layer plate D;

Automatic rinsing of the development chamber 1 and subsequent drying.

Automatic control of the temperature and/or pressure in the development chamber 1 during the activation, preconditioning, chromatographic development, drying and/or rinsing.

Continuous regeneration of the stream of gas leaving the development chamber 1 and restoring its composition to the desired composition before it is reintroduced into the development chamber 1.

In the method according to the invention, either one of these additional measures alone or any combination of these measures can be used. In the following, the optional steps listed above will now be explained.

The automatic opening/closing of the development chamber 1 and introduction/removal of the thin-layer plate D enables the integration of the present developing method and the corresponding apparatus in a larger automatic process. For example, in a first process step, the samples could be applied to the thin-layer plates D, the thin-layer plates D could then brought to the apparatus according to the invention and, after the chromatographic development, eventually forwarded to another module, for example for evaluation.

The automatic introduction and removal of the eluent into the development chamber 1 makes it possible to automatically introduce and remove the eluent at the right moment (before and after chromatographic development).

During the chromatographic development, part of the eluent is absorbed by the thin-layer plate D, and another part evaporates in the development chamber 1. In order to replace this eluent and ensure a constant eluent level over the entire duration of the chromatographic development, the eluent must be constantly refilled in the development chamber 1. The automatic regulation of the eluent level reduces the development time and ensures that the chromatographic development takes place under conditions that are as reproducible as possible.

The control of the migration of the eluent is particularly important because most chromatographic developments must be stopped in time when a defined migration height is reached. As soon as the eluent front reaches the height defined by the user in the separation layer, this can be signaled to the user and/or the eluent can be automatically removed from the development chamber 1 and/or the thin-layer plate D can be automatically dried.

In order to dry the thin-layer plate D after the chromatographic development, a strong, possibly warm stream of gas can be generated in the development chamber 1. During the drying of the thin-layer plate D, the remaining eluent evaporates and is completely removed from the development chamber 1. This is particularly advantageous if the eluent is harmful so that the user is exposed to it as little as possible. In order to accelerate the drying and the evaporation of the eluent, a partial vacuum can also be generated in the development chamber 1. After drying, the thin-layer plate D can be taken out of the development chamber 1 and analyzed.

In order to avoid carry-overs, it is particularly advantageous if the development chamber 1 is automatically rinsed and cleaned at the very beginning and/or at the very end of each chromatographic development process. This is achieved by introducing a rinsing liquid into the development chamber which remains therein for a certain time (for the dissolution of residues, for example) before it is removed. In order to accelerate this, the rinsing liquid can be driven out of the development chamber 1 with a stream of gas and the development chamber 1 can then also be dried immediately with a stream of gas.

It is particularly advantageous when the inner temperature and/or the inner pressure of the development chamber 1 are automatically controlled and regulated during the activation, preconditioning, chromatographic development, drying and/or rinsing. For example, an elevated temperature may accelerate or slow down processes such as the migration of the eluent in the separation layer, the evaporation of the eluent, the dissolution of residues during the rinsing etc. The adjustment of the temperature and pressure is also advantageous in order to artificially reproduce the pressure and temperature conditions of previous chromatographic developments in the development chamber 1, for example for cross-plate and cross-site comparisons.

Apparatus

Figure 2A:
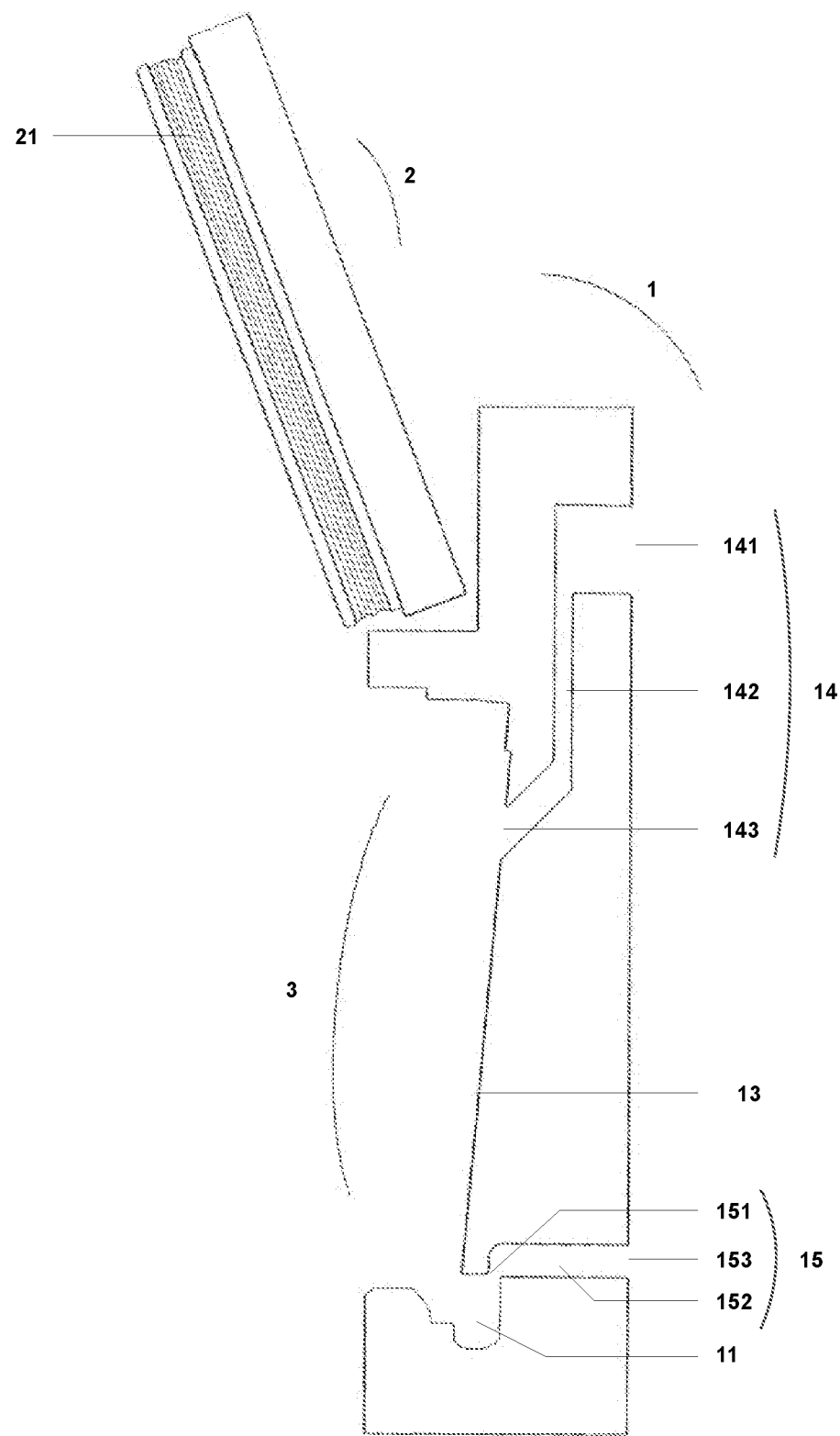
FIG. 2*a*: Side view of the apparatus in the open position, development chamber in section.
Figure 2B:
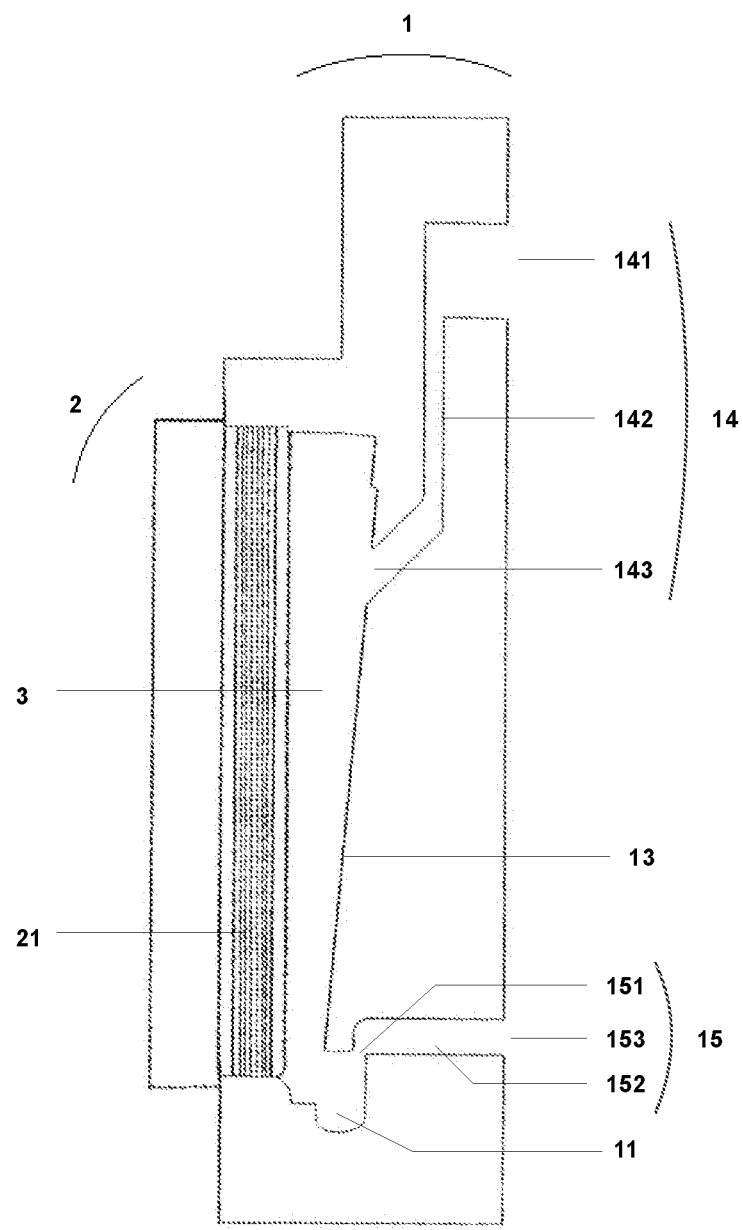
FIG. 2*b*: Side view of the apparatus in the closed position, development chamber in section.

The apparatus according to the invention consists of a development chamber 1 with a door 2, which is movable between an open and a closed position (FIGS. 1 and 2a-b). In the closed position, an inner atmosphere is enclosed in a cavity 3 of the development chamber 1 and completely sealed off and isolated from the environment (FIG. 2b). The thorough sealing-off of the cavity 3 is crucial in order to isolate it from external influences as much as possible during the activation, the preconditioning and the chromatographic development and to create as reproducible conditions in the development chamber 1 as possible. This is particularly advantageous for the use of harmful substances in the cavity 3, so that the user is exposed to these substances as little as possible. For a good sealing-off of the cavity 3, the door 2 and/or the development chamber 1 is provided with a seal 21, made for example of an elastomer such as rubber.

Figure 3A:
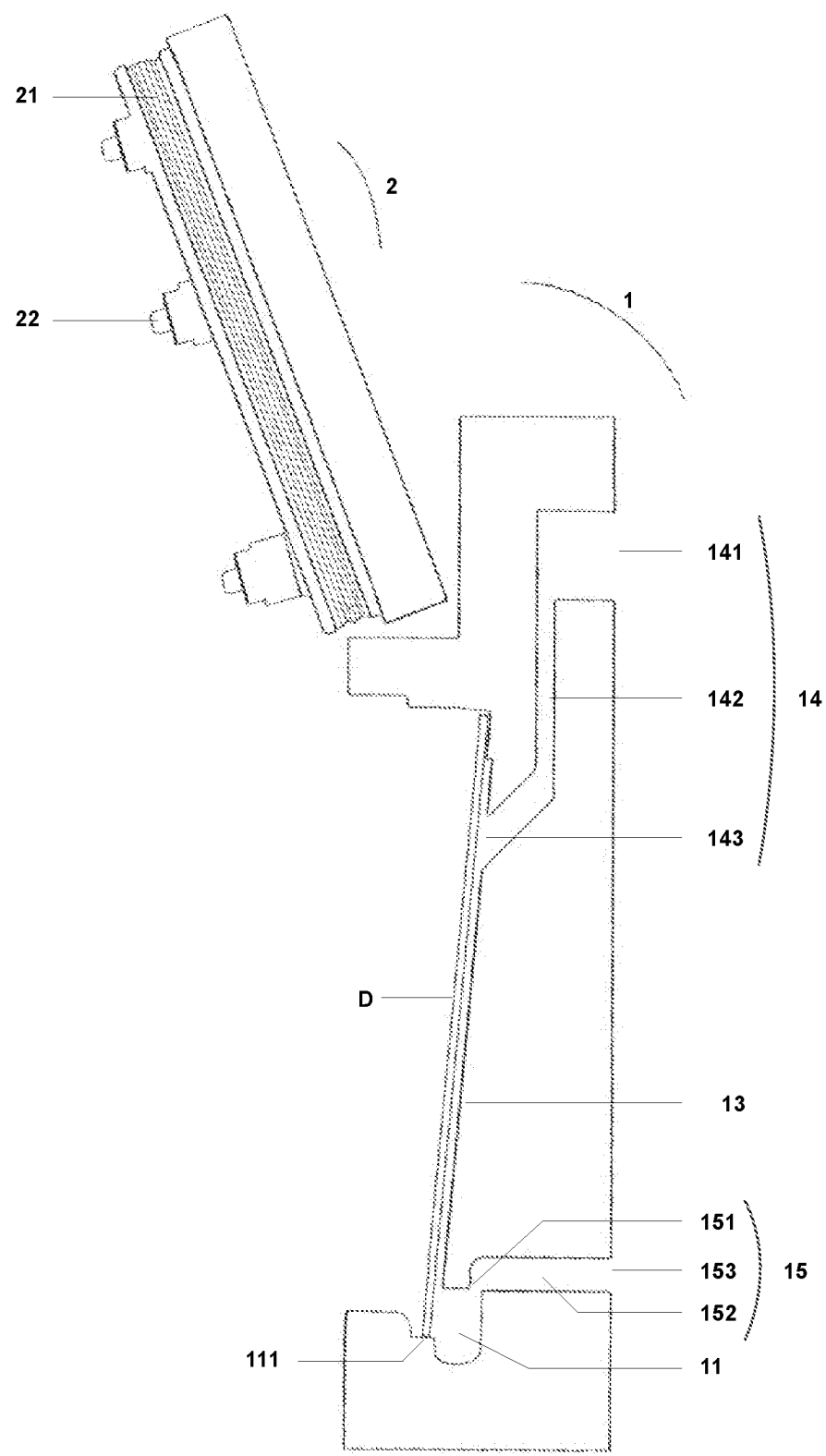
FIG. 3*a*: Side view of an exemplary embodiment of the apparatus in the open position, with inserted thin-layer plate, development chamber in section.
Figure 3B:
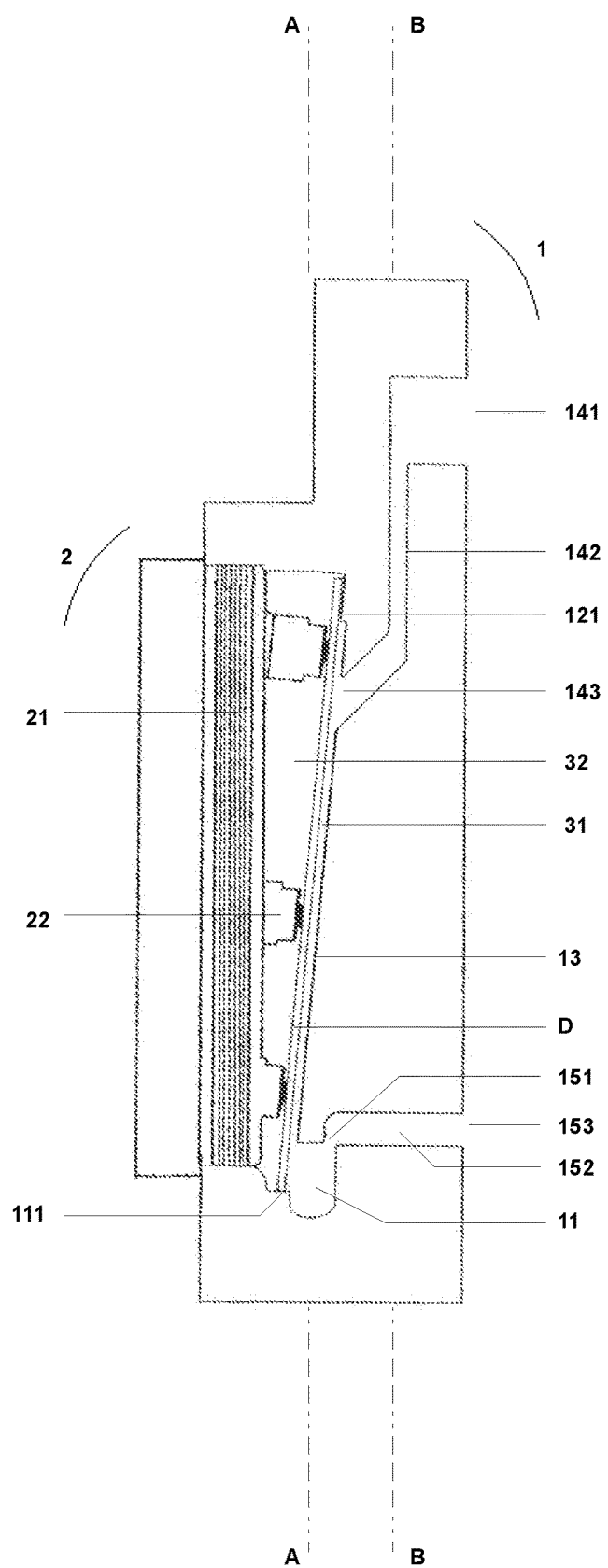
FIG. 3*b*: Side view of an exemplary embodiment of the apparatus in the closed position, with inserted thin-layer plate, development chamber in section.

The development chamber 1 and the cavity 3 are optimized for the insertion of a thin-layer plate D. In the preferred embodiment of the invention, the cavity 3 is oriented substantially vertically and an eluent trough 11 is provided at the lower end of the cavity 3 (FIGS. 2a-b and 3a-b). The thin-layer plate D is placed in the eluent trough 11, for example on a holder 111, so that it leans against a wall of the cavity 3 and its lower end is immersed into the eluent during the chromatographic development (FIGS. 3a-b).

According to the invention, the cavity 3 in which the thin-layer plate D is isolated is as small as possible and has the smallest possible volume of inner atmosphere: a small volume of gas can be regulated much more easily, changed more rapidly and thus kept more uniform than a large volume. Therefore, it is particularly advantageous if the height and width of the cavity 3 correspond approximately to the height and width of the thin-layer plate D to be developed (FIGS. 3a-b).

Figure 4:
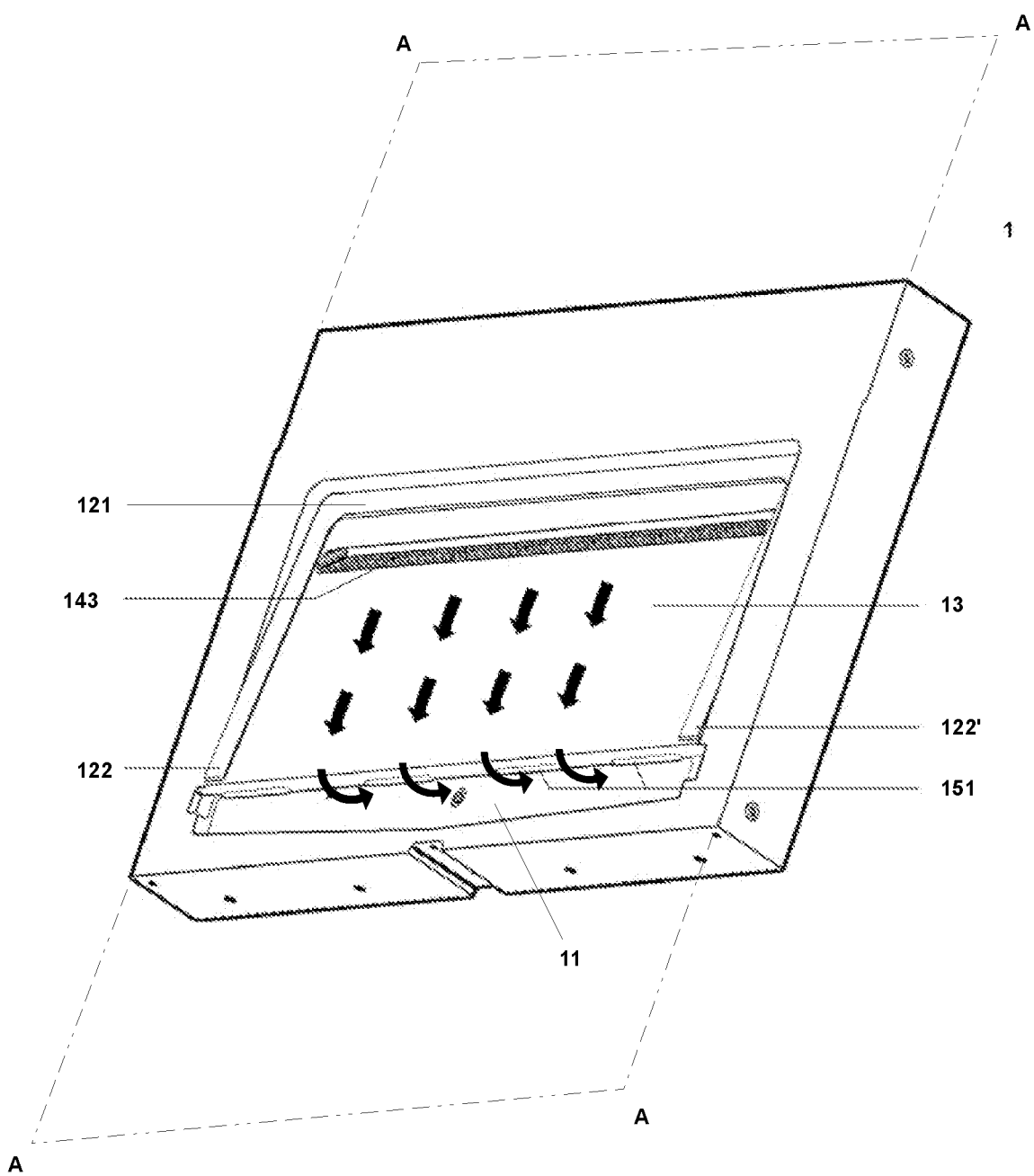
FIG. 4: Perspective view of an exemplary embodiment of the development chamber, section along plane A of FIG. 3*b*

In order to further reduce the volume of the inner atmosphere, the front side of the thin-layer plate D, on which the separation layer is located, is isolated from the rear side of the thin-layer plate D. Since the chromatographic development is performed only in the separation layer on the front side of the thin-layer plate D, the inner atmosphere can be restricted to a front space 31 located before and in immediate vicinity of the separation layer. The front space 31 is isolated by a raised U-shaped support surface 12 of the rear wall 13 of the cavity 3, against which the front side of the thin-layer plate D is leaned (FIG. 1). Thus, the space enclosed in the front space 31 is the space which is located between the front side of the thin-layer plate D and the rear wall 13 of the cavity 3, and which is laterally surrounded by the support surface 12. In the preferred embodiment of the invention, the support surface 12 consists of an upper part 121 and two lateral parts 122, 122' (FIGS. 3a-b and 4). The upper part 121 of the support surface 12 runs along the entire length of the upper end of the rear wall 13, and the two lateral parts 122, 122' run along the entire length of both lateral ends of the rear wall 13, so that the front space 31 is surrounded by the support surface 12 at least partially on at least 3 sides (FIG. 4). The eluent in which the lower end of the thin-layer plate D is immersed during the chromatographic development ensures the isolation of the front space 31 on the fourth, lower side. The front space 31 and the inner atmosphere contained therein are thus delimited at least partially on all sides. In the present specification, any reference to the "entire surface of the separation layer" (e.g. in the context of the inner atmosphere, which must be uniform over the surface of the separation layer and with the stream of gas which must act uniformly the entire surface of the separation layer) should be understood as a reference to the central region of the surface of the separation layer (also called "region of interest" (ROI)) which is in contact with the inner atmosphere located in the front space 31, since certain areas of the surface of the separation layer around the edges of the thin-layer plate D are in contact with the support surface 12 or immersed in the eluent.

Figure 7:
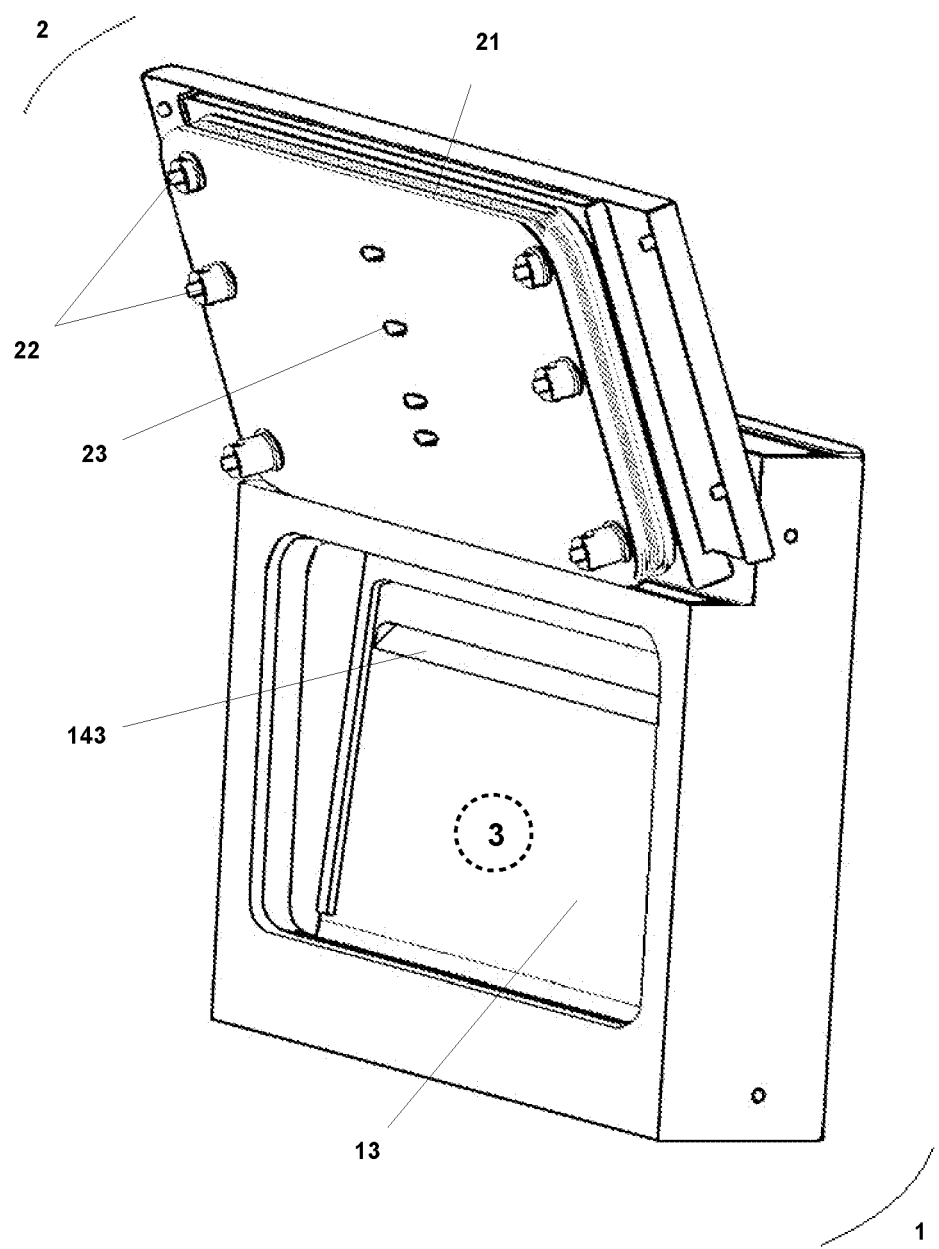
FIG. 7: Overall view of an exemplary embodiment of the apparatus.

In order to achieve a good isolation of the front space 31 from the rear side of the thin-layer plate D, the support surface 12 may be made of a material or coated with a material having a sealing effect. However, tests have shown that adequate isolation is achieved when the support surface is made of the same material as the development chamber 1 and has a width of about 1-2 cm. A better isolation may also be achieved by pressing the thin-layer plate D against the support surface 12, for example by means of plate pressers 22, which are arranged on the inside of the door 2 (FIG. 3a-b and FIG. 7).

The rear side of the thin-layer plate D consists of the carrier material, often glass, on which the separation layer is applied. Thus, the atmosphere of the back space 32 located on the rear side of the thin-layer plate D does not play an important role during the activation, preconditioning and chromatographic development and does not necessarily need to be regulated or controlled. Therefore, in the following, the term "inner atmosphere" shall refers to the gas phase located in the front space 31 in front of the separation layer of the thin-layer plate D.

In order to regulate the inner atmosphere, the development chamber 1 is provided with at least one inlet 14 and at least one outlet 15, through which gases or liquids can be delivered to and from the front space 31 by blowing and/or suction (FIGS. 2a-b). The at least one inlet 14 consists of at least one inlet entry opening 141, at least one inlet channel 142 and at least one inlet exit opening 143, which opens into the front space 31. Likewise, the at least one outlet 15 consists of at least one outlet entry opening 151 opening into the front space 31, at least one outlet channel 152 and at least one outlet exit opening 153. The arrangement and geometry of these various openings and the internal structure of the inlet and outlet channels 142, 152 are optimized for generating a strong continuous stream of gas throughout the whole front space 31. In order to allow the stream of gas to be generated also during the chromatographic development, when the eluent trough is filled with eluent, the inlet exit opening 143 and the outlet entry opening 151 must be arranged outside the eluent trough 11, above the eluent level.

It is advantageous if the flowing direction of the stream of gas has an angle of 0° or 180° to the direction of migration of the eluent in the separation layer. The eluent trough 11 is generally arranged at the lower end of the front space 31 and the eluent moves upwards in the separation layer, perpendicular to the eluent level in the eluent trough. This way, the inlet exit opening 143 can be arranged near the upper end of the front space 31 and the outlet entry opening 151 at the lower end of the front space 31, or vice versa, both openings being outside of the eluent trough 11.

In the preferred embodiment of the invention, the at least one inlet exit opening 143 is located near the upper end of the rear wall 13 and the at least one outlet entry opening 151 is at the lower end of the rear wall 13. Besides, the inlet exit openings 143 and the outlet entry openings 151 are distributed over the entire width of the rear wall 13. Alternatively, it is also possible to provide a single wide inlet exit opening 143 and/or outlet entry opening 151. In the embodiment of FIG. 4, for example, there is only one wide inlet exit opening 143 and four evenly spaced outlet entry openings 151. These measures make it possible to produce a stream of gas with straight and parallel flow lines throughout the entire front space 31, without a stationary area and stagnant or poorly renewed inner atmosphere (FIG. 4).

Figure 5A:
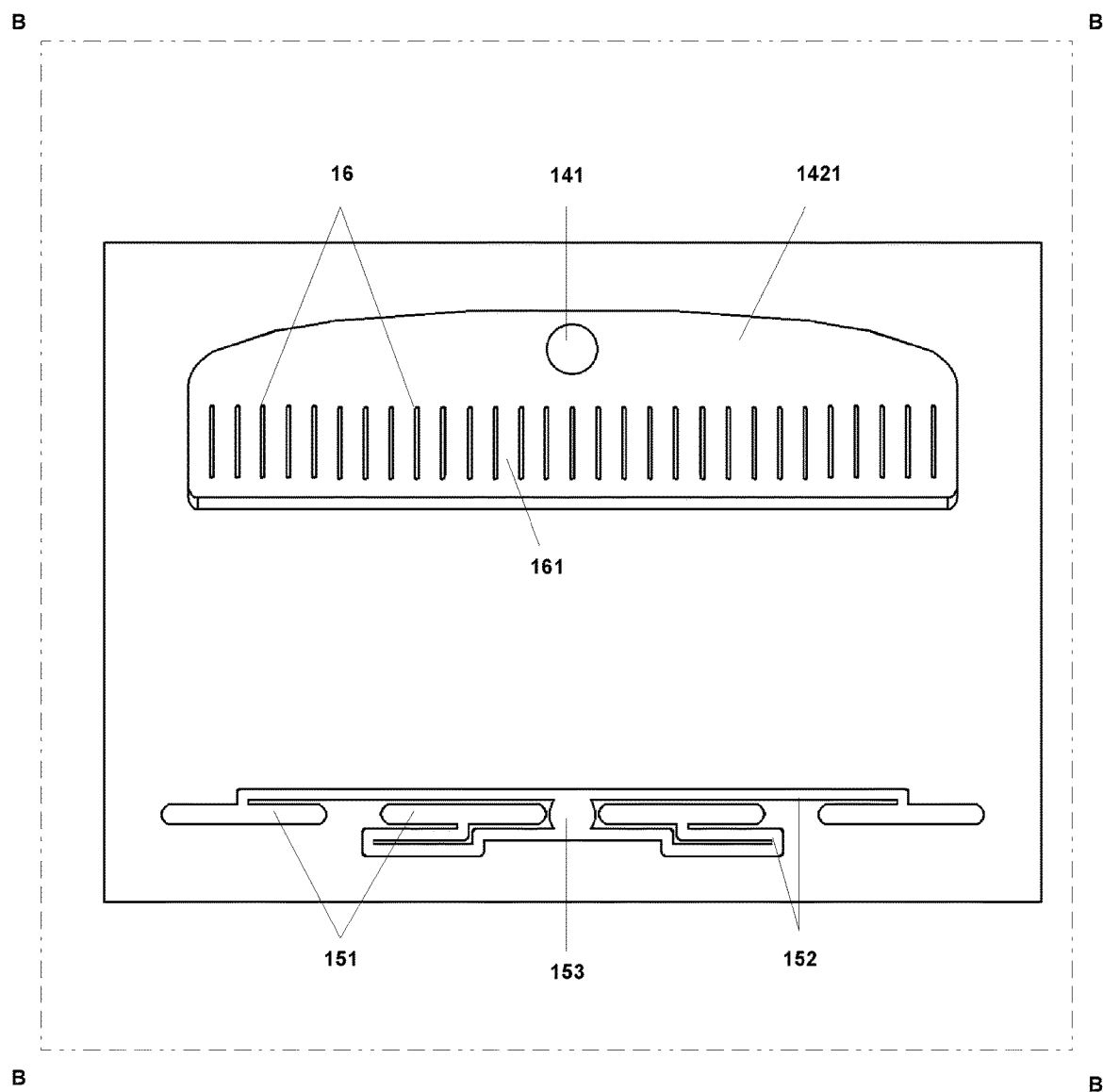
FIG. 5*a*: Front view of a variant of the development chamber, section through plane B according to FIG. 3*b*.
Figure 5B:
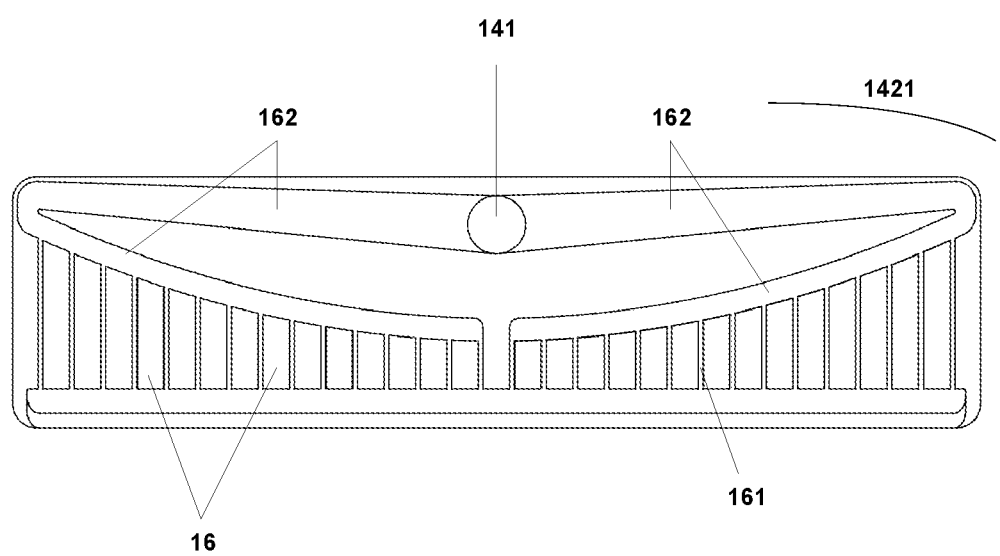
FIG. 5*b*: Exemplary embodiment of the laminating region, front view.

In a possible embodiment of the invention, the internal structure of the inlet channel 142 is also such that the stream of gas entering the front space 31 is distributed in a laminar manner and over the entire width of the inlet exit opening 143. For this purpose, the inlet channel 142 consists of two parts: a laminating region 1421, to which the inlet entry opening 141 leads, and an inclined segment 1422, which leads to the front chamber 31 (FIGS. 2a-b and 3a-b). The laminating region 1421 has the same width as the inlet exit opening 143 and is provided with a plurality of fins 16. In a simple embodiment of the invention, the fins 16 all have the same size, and they are arranged parallel to each other and at regular intervals (FIG. 5a). The fins 16 distribute the incoming stream of gas of the inlet entry opening 141 over the entire width of the laminating region 1421 and generate a laminar stream of gas by guiding it between the fins 16 in straight and parallel channels 161. For a better distribution of the stream of gas, it is also conceivable to arrange the fins 16 obliquely (not parallel, for example in radial direction with respect to the inlet entry opening 141) in other embodiments. In the embodiment of FIG. 5b, the stream of gas entering the laminating region 1421 is lead through two passages 162 and guided to narrow parallel channels 161 having different lengths. In order to distribute the stream of gas evenly through the various channels 161, the farther they are from the entrance of the laminating region 1421 (from the inlet entry opening 141), the shorter the channels 161 are. After the laminating region 1421, the laminar stream of gas is introduced into the front space 31 via the inclined segment 1422. The inclined segment 1422 has the same width as the inlet exit opening 143, and has a certain angle of inclination with respect to the direction of the stream of gas in the laminating region 1421 (FIGS. 2a-b and 3a-b). This angle of inclination must be as small as possible, so that the change in the flowing direction causes no turbulence and the laminar stream of gas is preserved as much as possible. It is particularly advantageous if the angle of inclination of the inclined segment 1422 is at most 45°.

In the preferred embodiment of the invention, the internal structure of the outlet channel 152 is such that the stream of gas leaves the development chamber 1 uniformly through the various outlet entry openings 151 and over the entire width of the front space 31. For example, each outlet entry opening 151 is connected with its own outlet channel 152 to the outlet exit opening 153, each outlet channel 152 having the same length. In order to achieve this, the outlet channels 152 of certain outlet entry openings 151 may, for example, be bent several times or zigzag-shaped (FIG. 5).

Figure 6:
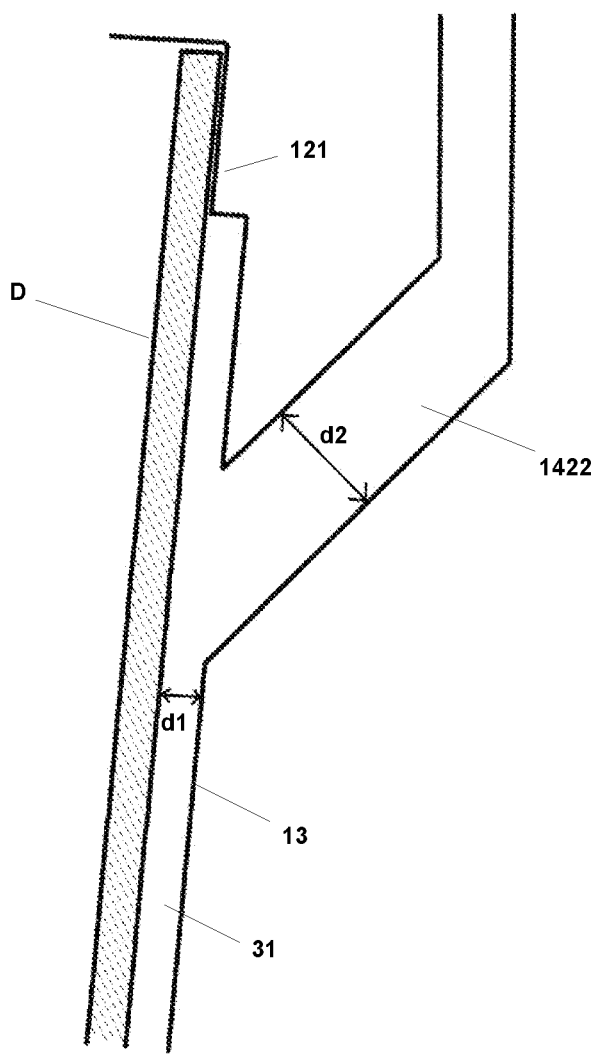
FIG. 6: Detail of the development chamber with inserted thin-layer plate.

The above-described arrangement and geometry of the inlet and outlet channels 142, 152 and the associated openings makes it possible to introduce a laminar stream of gas at one end of the front space 31 and possibly suck out the inner atmosphere at the other end of the front space 31, in order to generate a uniform laminar stream of gas throughout the whole front space 31. In order to preserve the laminar nature of the incoming stream of gas over the entire surface of the separation layer, the depth d1 of the front space 31, i.e. the distance between the front face of the thin-layer plate D and the rear wall 13 of the cavity 3, must be relatively small. The depth d1 of the front space 31 corresponds to the height of the support surface 12 above the rear wall 13, which is preferably between 1 and 3 mm, most preferably about 2 mm (except in the region of the fluid trough 11, at the lower end of the front space 31). Experiments have shown that with depths d1 of more than 3 mm, undesirable turbulences arise in the front space 31, and that at depths d1 of less than 1 mm, capillary forces cause undesirable artifacts. Besides, it is advantageous if the depth d1 of the front space 31 is smaller than the diameter d2 of the oblique segment 1422, so that entry into the front space 31 constitutes a narrowing of the stream of gas (FIG. 6). This ensures that the incoming stream of gas drives the inner atmosphere already in the development chamber 1 frontally out of the development chamber 1 at once, without turbulence and without mixing with it. This is also how the desired flow rate of the stream of gas and the strong action of the stream of gas on the surface of separation layer is achieved. With the ubiquitous unidirectional, laminar stream of gas, the inner atmosphere is not only simply revolved, but constantly and completely renewed.

The rear wall 13 of the cavity 3 is preferably flat and parallel to the support surface 12, so that the rear wall 13 is also parallel to the surface of the separation layer, and the front space 31 has a uniform depth d1. Depending on the embodiment, however, the support surface 12 and the rear wall 13 may also have other geometries. For example, the rear wall 13 could also have grooves which are oriented parallel to the direction of the stream of gas.

At least one eluent supply line and one eluent discharge line are provided in the development chamber 1, through which the eluent trough 11 can be filled with eluent before the chromatographic development and subsequently emptied. It is optimal for the chromatographic development when the lowest approx. 5 mm of the thin-layer plate D are immersed in the eluent. In order to enable the complete emptying of the eluent trough 11, the eluent discharge line is advantageously arranged at the lowest point of the eluent trough 11. For the automatic control of the filling and emptying of the eluent trough 11, sensors, in particular optical sensors, can also be installed in the development chamber 1. Such sensors can also serve for the continuous regulation of the eluent level during the chromatographic development. The exact moment at which the eluent trough 11 is completely emptied or filled can also be determined automatically with these sensors, and the next method step can be started automatically and immediately thereafter.

To control the migration of the eluent in the separation layer during the chromatographic development, one or more openings may be provided in the rear wall 13 of the development chamber 1 or in the door 2, for example for optical sensors. If thin-layer plates D with transparent carrier material such as glass are used, the openings 23 and the sensors can be arranged in the door 2 and track the migration of the eluent in the separation layer through the carrier material (FIG. 7). With these sensors, the exact moment at which the eluent front has reached the desired migration distance can be determined automatically, and the next method step can be started automatically and immediately thereafter.

The presented apparatus for the automatic chromatography of thin-layer plates D is well suited not only for the chromatographic development itself, but also for carrying out the additional method steps listed above, as explained below.

For the automatic insertion/removal of the thin-layer plate D into/from the development chamber 1, means for plate transport (e.g. a conveyor belt) and plate positioning may be provided. For example, flat-lying thin-layer plates D can be tilted into a vertical orientation and leaned against the rear wall 13 of the cavity 3 with a tilting mechanism.

The inlet 14 and the outlet 15 are also well suited for generating the stream of gas required for the activation. With the above-described arrangements and geometries of the inlet and outlet channels 142, 152 and of the associated openings, the stream of gas generated through the front space 31 is laminar. The laminar nature of the stream of gas ensures a uniform moistening of the separation layer. Thanks to the strong action of the stream of gas on the surface of the separation layer, the desired moisture is achieved in about 5 minutes with the apparatus according to the invention, while this may typically take 10 minutes with conventional measures. In order to control the humidity and/or the temperature of the stream of gas, the apparatus according to the invention may additionally comprise moisture and/or temperature sensors. With these sensors, the exact moment at which the desired amount of water has been reached on the separation layer can be determined automatically, and the next method step can be started automatically immediately thereafter. As soon as the loading of the stationary phase with water molecules is in equilibrium with the relative humidity of the stream of gas, the separation layer no longer absorbs water molecules.

The same applies to the preconditioning. Again, the invention allows a significant economy of time: thanks to the very limited volume of the inner atmosphere and to the unidirectional, laminar incoming stream of gas, which drives the inner atmosphere out of the front space 31 frontally, at once, without turbulence and without mixing with it, the desired loading of the separation layer and of and the inner atmosphere is completed extremely fast.

Figure 8A:
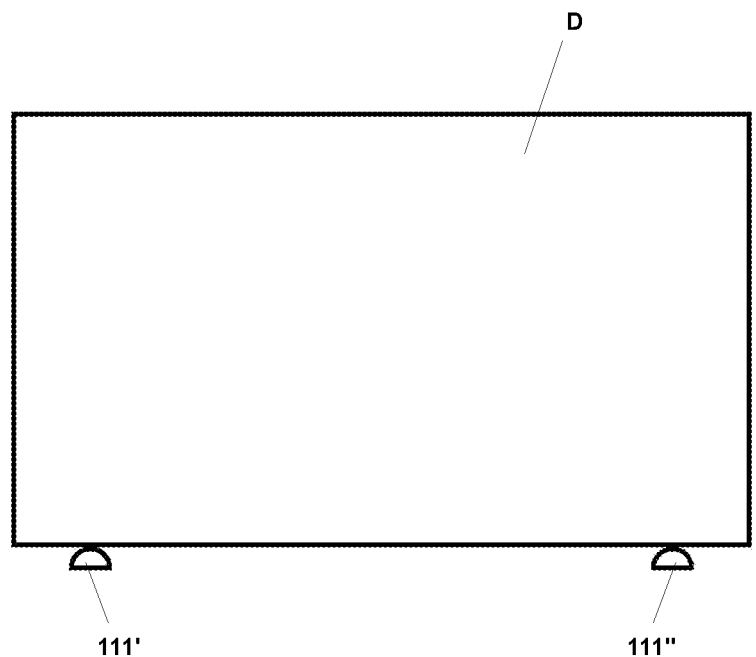
FIG. 8a: Embodiment with two semi-cylindrical rods, development chamber open
Figure 8B:
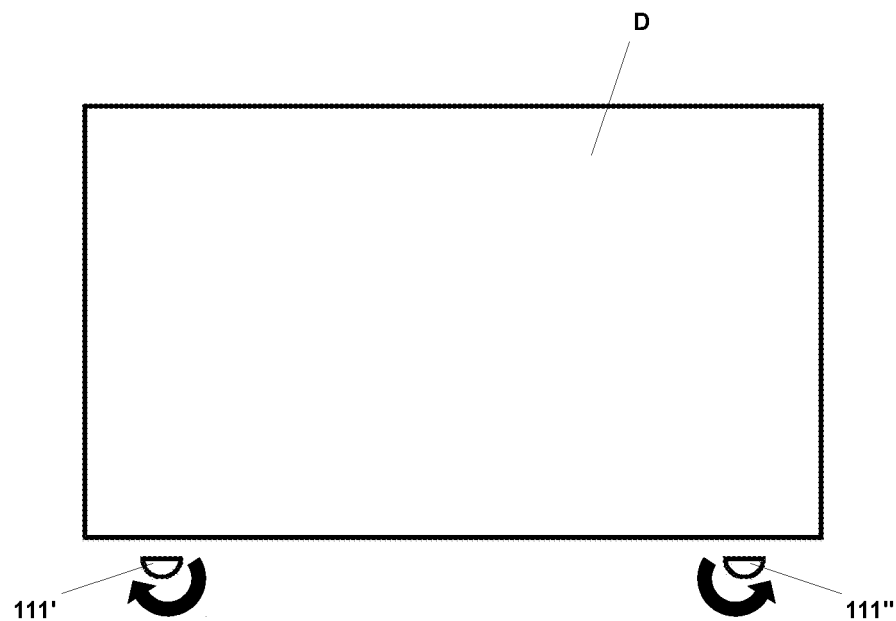
FIG. 8b: Embodiment with two semi-cylindrical rods, development chamber closed

For drying, a strong, possibly warm stream of gas can be generated either through the inlet 14 and the outlet 15, or through additional gas inlets and gas outlets. Experiments have shown that contact points between the lower edge of the thin-layer plate D and the holder 111, on which the thin-layer plate D is placed, are difficult to dry. The eluent trapped between them can cause artifacts in the chromatogram. In the preferred embodiment of the invention, there is no contact between the thin-layer plate D and the holder 111 in the closed development chamber 1. This can be achieved for example by moving the holder 111 away from the lower edge of the thin-layer plate D upon or after closing the door 2. This way, the thin-layer plate D retains its position as it is clamped between the door 2 and the support surface 12. In one possible embodiment, the holder 111 consists of at least two semi-cylindrical rods 111', 111", which are rotated upon closing the door 2 (FIGS. 8*a-b*). FIG. 8*a* shows how the thin-layer plate D is placed on the rounded side of the semi-cylindrical rods 111', 111" in the open development chamber 1, and the FIG. 8*b* shows how the semi-cylindrical rods are turned away upon closing the door 2 so that their flat side is no longer in contact with the thin-layer plate D.

For rinsing the cavity 3, the inlet 14, the outlet 15 and/or the eluent trough 11, it is conceivable to introduce and remove a rinsing liquid either through the inlet 14 and the outlet 15 or through separate, additional openings in the development chamber 1. In order to dry the development chamber 1 after rinsing, gas inlets and gas outlets can also be provided.

The stream of gas leaving the development chamber 1 is continuously regenerated by injection into a bottle connected to the outlet 15 and containing a prepared buffer solvent mixture. Thus, the composition of the stream of gas is restored to the desired composition before being reintroduced into the development chamber 1. For circulating the gas phase and generating the stream of gas, a circulation pump can for example be installed at the outlet 15.

The apparatus according to the invention is advantageously made of an easily machinable, mechanically resistant, corrosion-resistant and chemically inert material suitable for use in a moist environment and with hot gas. Besides, the surface of the material must be smooth so that residues can be easily washed away. It is also advantageous if the material is opaque, so that the inventive apparatus is also suitable for handling photosensitive substances and in order to avoid photochemical artifacts. Plastics are preferred, for example PEEK (polyetheretherketone) or other plastics of the group of polyaryletherketones or Teflon.

Experiments have shown that an inflatable seal 21 which can be inflated with compressed air ensures a particularly good sealing-off of the cavity 3. Such a seal also has the advantage that the sealing takes place radially between the door frame and the corresponding opening in the development chamber 1, and thus the door 2 does not have to be pressed axially with great force against the development chamber 1.

According to the embodiment of FIGS. 1, 2*a-b*, 3*a-b* and 7, the door 2 is arranged on the front side of the development chamber 1 and rotatable between the open and the closed position, but in other possible embodiments, it can be arranged on other sides of the development chamber and/or be slidable between the open and the closed position. In other embodiments, the cavity could be inclined or even horizontal, wherein the thin-layer plate D is then laid in the cavity 3.

This disclosure teaches a method and an apparatus for the automatic chromatography of thin-layer plates, wherein four essential measures together allow the chromatographic development of thin-layer plates D under reproducible conditions:

a) the good sealing-off of the development chamber 1 and complete separation of the thin-layer plate D from the environment;

b) the limited volume of the inner atmosphere in front of the separation layer of the thin-layer plate D;

c) the automatic regulation of the composition of the inner atmosphere during the activation, the preconditioning and/or the chromatographic development and adaptation of the regulation by monitoring the various processes with sensors. With these sensors, the exact moment at which a desired, predefined state is reached can be determined automatically, and the next method step can be started automatically and immediately thereafter;

d) the renewal of the inner atmosphere and precise control of the stream of gas over the surface of the thin-layer plate during the activation, the preconditioning and/or the chromatographic development.

This ensures a greater accuracy and uniformity of the composition of the inner atmosphere of the development chamber 1 during the activation, the preconditioning and the chromatographic development and thus a higher quality and reproducibility of the chromatograms obtained.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method for automatic chromatography of thin-layer plates for thin-layer chromatography with a development chamber having a cavity in which a thin-layer plate is completely enclosed, sealed-off and isolated from the external environment, wherein a front space containing an inner atmosphere is located in the cavity on a front face of a separation layer of the thin-layer plate, comprising the following steps:
   a) activating by adjustment of the moisture of the separation layer of the thin-layer plate in the cavity in a first step;
   b) preconditioning by saturation of the inner atmosphere of the cavity with a specific gas phase composition and defined loading of the separation layer of the thin-layer plate with at least one substance in the cavity in a second step; and
   c) providing chromatographic development of the thin-layer plate in the cavity, wherein the thin-layer plate is brought into contact with an eluent which migrates in the separation layer of the thin-layer plate by capillary forces in a third step, wherein during at least one of steps b) or c), a stream of gas having a particular composition determined by a user is generated throughout the entire front space, and the entire inner atmosphere is set in motion, without stagnant or a stationary gas phase.

2. The method according to claim 1, wherein:
the stream of gas drives the inner atmosphere already in the front space frontally out of the development chamber, without turbulences and without mixing with it, so that the inner atmosphere is completely renewed with the stream of gas.

3. The method according to claim 1, wherein:
a flow rate of the stream of gas is set such that a flowing inner atmosphere remains in the front space only for a short time, so that its composition does not change significantly during the flow through the development chamber and is renewed continually.

4. The method according to claim 1, wherein:
a front side of the thin-layer plate on which the separation layer is located is isolated from the rear side of the thin-layer plate.

5. The method according to claim 1, wherein:
the stream of gas acts directly, strongly and uniformly on the surface of the separation layer.

6. The method according to claim 1, further comprising the following steps of:
introducing an eluent;
regulating an eluent level and detecting an eluent front;
removing the eluent; and
drying the thin-layer plate.

7. The method according to claim 1, wherein:
the steps follow each other automatically, so that the whole method proceeds autonomously and without manual interaction.

8. An apparatus for automatic chromatography of thin-layer plates for thin-layer chromatography with a development chamber having a cavity in which a thin-layer plate is completely enclosed, sealed-off and isolated from the external environment, wherein a front space is located in the cavity on a front face of a separation layer of the thin-layer plate, and an eluent trough is located at a lower end of the front space, the lower end of the thin-layer plate is located within the eluent trough, at least one inlet is provided at an upper end of the front space and at least one outlet is provided at an opposite lower end of the front space or vice versa, the outlet has an outlet entry opening in the front space outside the eluent trough.

9. The apparatus according to claim 8, wherein:
the at least one inlet comprises at least one inlet exit opening, the at least one outlet includes at least one outlet entry opening, and
the at least one inlet exit opening and the at least one outlet entry opening are distributed over the entire width of a rear wall of the cavity of the development chamber.

10. The apparatus according to claim 8, wherein:
a rear wall of the cavity of the development chamber has a raised U-shaped support surface against which a front side of a thin-layer plate can be leaned, so that the front space is surrounded by the support surface on at least 3 sides.

11. The apparatus according to claim 8, wherein:
the at least one inlet has a laminating region with channels which are shorter, the farther they are from ire an entrance of the laminating region.

12. The apparatus according to claim 8, wherein:
the at least one inlet has a laminating region, the laminating region being provided with parallel and regularly spaced fins.

13. The apparatus according to claim 8, wherein:
the at least one inlet has an inclined segment, wherein the inclined segment leads to the front space and is oriented at an angle of inclination of at most 45° with respect to a rear wall of the cavity of the development chamber.

14. The apparatus according to claim 8, wherein:
the outlet includes at least one outlet entry opening into the front space, at least one outlet channel and at least one outlet exit opening, each outlet entry opening being connected with its own outlet channel to the outlet exit opening, each outlet channel has the same length and the at least one outlet channel having a bent or zigzag-shaped.

15. The apparatus according to claim 8, wherein:
the development chamber has a door which is rotatable or slidable between a closed position and an open position, and for sealing-off of the cavity of the development chamber, at least one of the door and the development chamber are provided with an inflatable seal.

\* \* \* \* \*